United States Patent
Kemmerer et al.

(10) Patent No.: US 11,430,421 B2
(45) Date of Patent: Aug. 30, 2022

(54) ADAPTIVE NULL FORMING AND ECHO CANCELLATION FOR SELECTIVE AUDIO PICK-UP

(71) Applicant: Bose Corporation, Framingham, MA (US)

(72) Inventors: Jeremy Kemmerer, Holliston, MA (US); Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 73 days.

(21) Appl. No.: 16/695,536

(22) Filed: Nov. 26, 2019

(65) Prior Publication Data
US 2020/0098346 A1  Mar. 26, 2020

Related U.S. Application Data

(63) Continuation-in-part of application No. 16/445,908, filed on Jun. 19, 2019, now abandoned, which is a
(Continued)

(51) Int. Cl.
*H04R 3/00* (2006.01)
*G10K 11/16* (2006.01)
(Continued)

(52) U.S. Cl.
CPC .......... *G10K 11/16* (2013.01); *G10L 21/0208* (2013.01); *H04R 3/005* (2013.01);
(Continued)

(58) Field of Classification Search
CPC .......... G10L 15/22; G10L 2021/02082; G10L 21/0208; G10L 2021/02165; G10L 2021/02166; G10L 2021/02161
(Continued)

(56) References Cited

U.S. PATENT DOCUMENTS 9,508,359 B2    11/2016  Gao
10,229,698 B1 *  3/2019  Chhetri ............... G10L 21/0208
(Continued)

FOREIGN PATENT DOCUMENTS

EP    1633121 A1   3/2006
EP    2608197 A1   6/2013
WO  2019089716 A1   5/2019

OTHER PUBLICATIONS

International Search Report and Written Opinion dated Mar. 5, 2019 for PCT/US2018/058391.
(Continued)

*Primary Examiner* — Disler Paul
(74) *Attorney, Agent, or Firm* — Bose Corporation

(57) ABSTRACT

Audio pickup systems and methods are provided to enhance an audio signal by removing noise components related to an acoustic environment. The systems and methods receive a primary signal and one or more reference signals from various microphones. Adaptive filtering and combining minimizes an energy content of a resulting output signal, e.g., to form a substantially null output when the system is in a static acoustic environment. When the system is a playback sound source, one or more echo cancellers may contribute to removing content from the output signal. A change in the acoustic environment, such as a new sound source, causes content in the output signal until the adaptive filtering adapts to the new environment. In some examples, a desired content such as a wake-up word is detected and adaptation is stopped.

11 Claims, 10 Drawing Sheets

Related U.S. Application Data continuation of application No. 15/800,909, filed on Nov. 1, 2017, now Pat. No. 10,354,635.

(51) Int. Cl.
*G10L 21/0208* (2013.01)
*G10L 15/22* (2006.01)
*G10L 21/0216* (2013.01)

(52) U.S. Cl.
CPC ...... *G10K 2210/3028* (2013.01); *G10L 15/22* (2013.01); *G10L 2021/02082* (2013.01); *G10L 2021/02161* (2013.01); *G10L 2021/02165* (2013.01); *G10L 2021/02166* (2013.01)

(58) Field of Classification Search
USPC ...................... 381/94.1–94.7, 96, 110, 66, 83
See application file for complete search history.

(56) References Cited

U.S. PATENT DOCUMENTS

| | | | |
|---|---|---|---|
| 2011/0019832 A1 | 1/2011 | Itou et al. | |
| 2012/0197638 A1* | 8/2012 | Li | G10L 21/0208 704/226 |
| 2013/0039503 A1* | 2/2013 | Beaucoup | H04M 9/082 381/66 |
| 2014/0003612 A1* | 1/2014 | Saito | G10K 11/002 381/66 |
| 2018/0033428 A1* | 2/2018 | Kim | G10L 15/22 |
| 2019/0259408 A1 | 8/2019 | Freeman et al. | |

OTHER PUBLICATIONS

International Search Report and Written Opinion dated Jul. 24, 2020 for PCT/US2019/063236.

\* cited by examiner

ADAPTIVE NULL FORMING AND ECHO CANCELLATION FOR SELECTIVE AUDIO PICK-UP

CROSS-REFERENCE TO RELATED APPLICATIONS

This application is a continuation-in-part and claims the benefit under 35 U.S.C. § 120 of U.S. patent application Ser. No. 16/445,908 titled ADAPTIVE NULLFORMING FOR SELECTIVE AUDIO PICK-UP filed on Jun. 19, 2019, which is a continuation of U.S. patent application Ser. No. 15/800,909 titled ADAPTIVE NULLFORMING FOR SELECTIVE AUDIO PICK-UP filed on Nov. 1, 2017, now U.S. Pat. No. 10,354,635 granted on Jul. 16, 2019, each of which is hereby incorporated by reference for all purposes.

BACKGROUND

Audio systems sometimes include one or more acoustic transducers to convert acoustic signals into electrical signals (e.g., microphones) to detect acoustics in the environment in which they operate, and sometimes also include acoustic drivers (e.g., loudspeakers) to reproduce acoustic audio content from an electrical signal. Microphones may be deployed in such systems for the purpose of detecting desired audio, which may include a user's speech for applications such as automatic speech recognition, virtual personal assistants, and communications (e.g., telephone), for example. Often, the environment in which the audio system is used includes additional acoustic sources other than the desired audio, such as televisions, other audio systems, noise from equipment, etc., and these alternate acoustic sources may sometimes interfere with the detection and/or processing of the desired audio, e.g., the user's speech. The acoustic environment in which the audio system operates may generally be unknown, and may change significantly over time. Accordingly, alternate or undesired acoustic signals may be unknown at the outset and may also change significantly over time.

SUMMARY

Aspects and examples are directed to systems and methods to pick-up desired audio signals, such as speech activity of a user, and reduce other signal components, such as alternate acoustic sources, background noise, and/or echoed playback, to enhance the desired signal components in an output signal. The systems and methods provide enhanced isolation of the desired signal by removing or reducing other signal sources. Various applications include automated speech recognition for, e.g., virtual personal assistants (VPA), and the like. Aspects and examples disclosed herein allow an audio system to pick-up and enhance a desired signal, such as a user's voice, so the user may use such applications with improved performance in noisy environments and/or at high playback volumes. According to one aspect, a method of enhancing an audio signal is provided, the method includes receiving a primary signal from one or more microphones, receiving a plurality of reference signals, each of the plurality of reference signals from one of a plurality of reference microphones, receiving a playback signal, generating a driver signal based upon the playback signal, providing the driver signal to a transducer for conversion into an acoustic signal, generating an estimated echo signal based at least in part upon the playback signal, generating an estimated noise signal based upon the plurality of reference signals, and reducing at least one of a noise content or an echo content from the primary signal to generate an output signal, the reduction based at least in part upon the estimated echo signal or the estimated noise signal.

According to various examples, generating the estimated noise signal may include adaptively filtering the plurality of reference signals to minimize an energy content of the output signal.

Certain examples include monitoring the output signal for a desired signal and freezing the adaptive filtering of the plurality of reference signals upon detecting the desired signal.

Some examples include evaluating the effectiveness of at least one of the estimated echo signal or the estimated noise signal and controlling the generation of at least one of the estimated echo signal or the estimated noise signal based upon the evaluation. In various cases, the evaluation may be based, at least in part, on a signal energy. In certain examples the signal energy may be related to a playback volume.

According to further examples, controlling the generation of at least one of the estimated echo signal or the estimated noise signal may include disabling the generation of the at least one of the estimated echo signal or the estimated noise signal.

According to another aspect, an audio system is provided that includes a primary input to receive a primary signal, a plurality of reference inputs, each of the plurality of reference inputs to receive a reference signal, a playback input to receive a playback signal, an echo canceller configured to generate an estimated echo signal based, at least in part, upon the playback signal, a null former configured to generate an estimated noise signal based, at least in part, upon one or more of the reference signals, and one or more combiners configured to produce an output signal, based upon the primary signal, with reduced echo or noise content based at least in part upon the estimated echo signal or the estimated noise signal.

According to some examples, the null former is configured to generate the estimated noise signal by adaptively filtering the one or more reference signals to minimize an energy content of the output signal.

Certain examples may include a detector configured to detect a desired signal component in the output signal and to pause adaptation of the adaptive filtering in response to detecting the desired signal.

Various examples include a controller configured to evaluate the effectiveness of at least one of the echo canceller or the null former and to control at least one of the echo canceller or the null former based upon the evaluation. The evaluation may be based, at least in part, on a signal energy. The signal energy may be related to a playback volume in some examples.

In certain examples, controlling at least one of the echo canceller or the null former may include disabling the at least one of the echo canceller or the null former.

According to yet another aspect, an audio system is provided that includes an input to receive a playback signal, a transducer coupled to the input to produce an acoustic signal based upon the playback signal, a primary microphone to provide a primary signal, a reference microphone to provide a reference signal, an echo canceller configured to generate an estimated echo signal based, at least in part, upon the playback signal, a null former configured to generate an estimated noise signal based, at least in part, upon the reference signal, and one or more combiners configured to produce an output signal, based upon the primary signal, with reduced echo or noise content based at least in part upon the estimated echo signal or the estimated noise signal.

According to some examples the null former is configured to generate the estimated noise signal by adaptively filtering the reference signal to minimize an energy content of the output signal.

Various examples may include a detector configured to detect a desired signal component in the output signal and to pause adaptation of the adaptive filtering in response to detecting the desired signal.

Certain examples may include a controller configured to evaluate the effectiveness of at least one of the echo canceller or the null former and to control at least one of the echo canceller or the null former based upon the evaluation. The evaluation may be based, at least in part, on a signal energy. The signal energy may be related to a playback volume.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like numeral. For purposes of clarity, not every component may be labeled in every figure. In the figures.

DETAILED DESCRIPTION

Figure 1A:
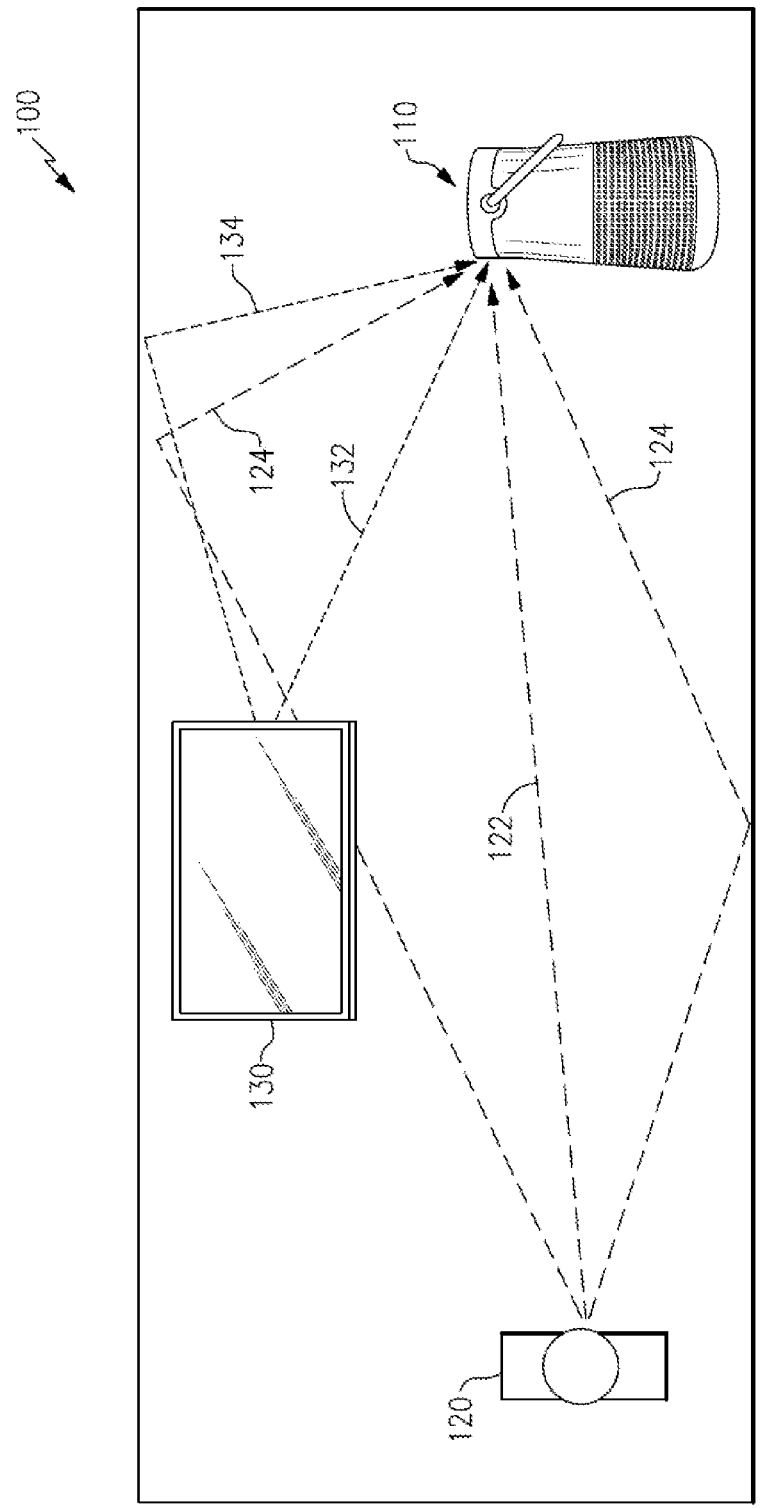
FIGS. 1A-1C are schematic diagrams of an example environment in which an example audio system may operate.

Aspects of the present disclosure are directed to audio systems and methods that use a plurality of microphone signals to pick-up a desired signal, such as a voice signal of a user, while reducing or removing other signal components. Providing a user's voice signal with reduced noise components may enhance voice-based features or functions available as part of an audio system or other associated equipment, such as communications systems (cellular, radio, aviation), entertainment systems (gaming), speech recognition applications (speech-to-text, virtual personal assistants), and other systems and applications that process audio, especially speech or voice. Examples disclosed herein may be coupled to or placed in connection with other systems through wired or wireless means, or may be independent of other systems or equipment.

The example audio systems and methods described herein may include content playback systems (e.g., an audio input, amplifier, and loudspeaker) and may include multiple microphones to detect acoustic signals in the environment. The example audio systems and methods may include echo cancellation components to remove the system's own playback signal (which may be picked up by one or more of the microphones) and may include null forming components that remove (over time) other acoustic sources in the environment. In various examples, the microphone signals may be combined by a beamformer to provide a primary signal. The primary signal may be modified by the null former to remove undesired acoustic signals, such as substantially fixed acoustic sources and/or user speech that isn't of interest, e.g., user speech that isn't a command, wake-up word, etc., and the primary signal may be modified to remove echo components from a content playback operation of the audio system. Each of the echo cancellation components, the null forming components, and beamformer(s) may be controlled by a controller.

In various examples, operation of beamformer(s), null former(s), and echo canceller(s) may cause the audio system or method to adapt to the acoustic environment, on an on-going basis, to provide an output signal having reduced or substantially nullified components from various acoustic signals in the environment. In various examples, a substantially null response may include providing an output signal with a minimized energy content. In some examples, a change in the acoustic environment, such as a user starting to speak or the presence of a new acoustic signal, which may be a desired signal, to which the null former components have not yet adapted, may provide components of the new signal in an output signal, at least for a period of time during which the new signal may be evaluated, e.g., whether it is a desired signal.

Conventional methods that adapt to an acoustic environment to provide desired signals require certain characteristics of the desired signal, such as a certain source location or arriving phase relationship, and/or require a blocking matrix to effectively enhance or cancel signals from certain directions prior to adaptation, at the expense of increased processing power, resources, and/or energy consumption.

Production of a signal wherein a user's voice components are enhanced while other components are reduced may be referred to generally herein as voice pick-up, voice isolation, speech enhancement, and the like. As used herein, the terms "voice," "speech," "talk," and variations thereof are used interchangeably and without regard for whether such speech involves use of the vocal folds.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, right and left, top and bottom, upper and lower, and vertical and horizontal are intended for convenience of description, not to limit the present systems and methods or their components to any one positional or spatial orientation.

FIG. 1A illustrates an example environment 100 where an example audio system 110 may be in use. The environment 100 may include the audio system 110, a user 120 whose speech is to be detected and provided for further processing, and one or more additional acoustic source(s) 130, such as a television, a radio, a fan, etc. When the user 120 speaks, he or she may produce a direct acoustic signal 122 and/or one or more indirect acoustic signals 124, which may reach the audio system 110. An output signal representative of the user's speech (e.g., representative of the direct acoustic signal 122) is desired to be provided by the audio system 110 for further processing, and may be in an electrical (digital or analog) form, for example. The additional acoustic source(s) 130 also may produce one or more direct acoustic signals 132 and/or indirect acoustic signals 134 that reach the audio system 110. These acoustic signals from the additional acoustic source(s) 130 are preferably reduced or removed from being represented in the output signal. Accordingly, an output signal provided by the audio system 110 may include a robust signal-to-noise ratio (SNR), e.g., each of the acoustic signals that are not the user's voice being considered "noise" signals, for example. In some examples, the audio system 110 itself may be an acoustic source in the environment. As described in more detail below, in various examples the audio system 110 may include playback components (e.g., audio input, amplifier, loudspeaker, etc.) to render a content playback signal into an acoustic signal, such as for listening to music, telephone call audio, etc. The playback acoustic signal may also reach the audio system 100 through direct and reflected means, and in some instances the loudspeaker vibrations may couple to microphones more directly, e.g., through an enclosure or chassis of the audio system 110, especially at high playback volumes.

Figure 1B:
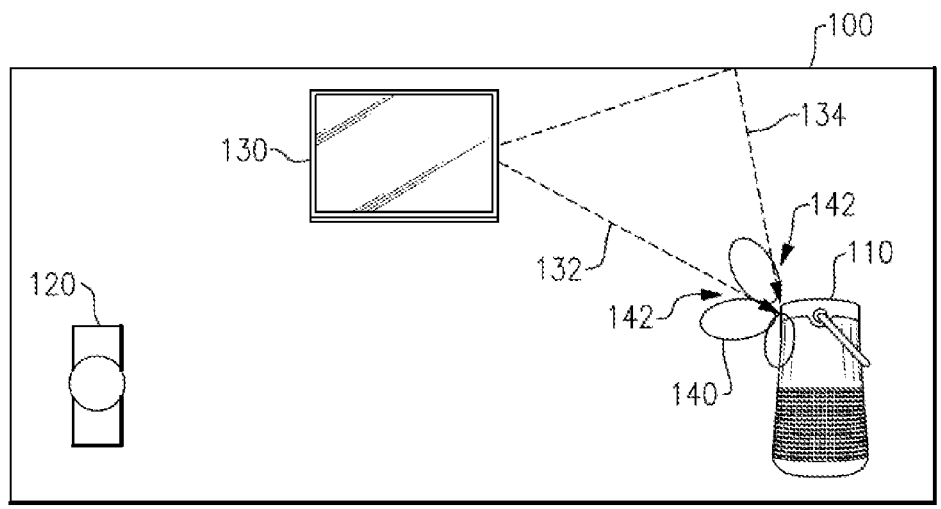

Various examples described herein may apply adaptive filters to one or more microphone signals to produce a substantially null response to the acoustic environment (e.g., to acoustic signals in the environment). For example, FIG. 1B illustrates the example audio system 110 operating in the environment 100 while the user 120 is not speaking. A primary microphone associated with the audio system 110 may pick up acoustic signals, such as the acoustic signals 132, 134, arriving at the audio system 110, and provide a microphone signal that includes components from many or all of the acoustic sources in the environment. Additional microphones (secondary or reference microphones) associated with the audio system 110 may also pick up the same or similar acoustic signals, e.g., forming an array of microphones providing individual microphone signals having variations in arrival times, phase, and amplitude, with respect to each other and the primary microphone. Adaptive filters are applied in various examples to the reference microphone signals and used to modify the primary microphone signal to create a substantially null response, as described in more detail below.

Accordingly, a spatial response pattern 140 of the audio system 110 may form null responses 142 for acoustic signals arriving from the directions of, e.g., the acoustic signals 132, 134. While the spatial response pattern 140 may be shown as forming beams and nulls, such is merely for illustrative purposes and various examples described herein will not necessarily form beams of enhanced response and will not necessarily form nulls in a strict sense. Various examples may reduce an acoustic response for acoustic signals coming from certain directions, e.g., based upon the direction(s) to alternate acoustic sources and adaptation as described herein, thus reducing representative content from such acoustic sources in an output signal. Such reduced content and/or reduced response may generally be referred to herein as null forming.

Figure 1C:
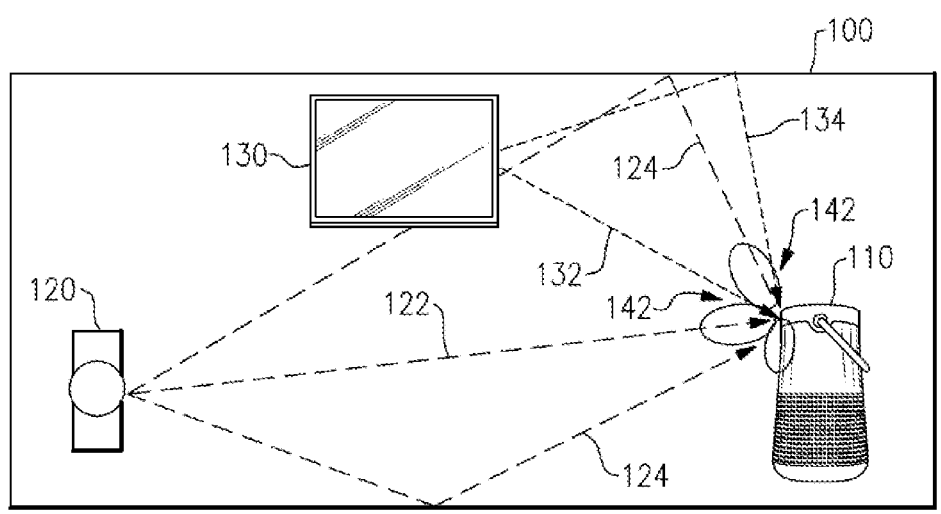

A change in the acoustic environment, such as a new acoustic source or the user starting to speak, as illustrated in FIG. 1C, may produce new acoustic signals, such as the acoustic signals 122, 124, for which the audio system 110 has not formed null responses 142. Accordingly, an output signal from the audio system 110 may include components of the new acoustic signal, e.g., the user's speech. In some examples, the adaptive filters operating on the reference microphone signals may take some time to adapt to the new acoustic signal (e.g., the speech of the user 120) and the time for adaptation may be sufficient to detect that the user is speaking and/or to detect what the user says (e.g., via speech recognition).

In some examples, a time for adaptation by the adaptive filters may be long enough for a command or instruction spoken by the user 120 to be provided in an output signal, prior to the adaptive filters forming a new null that may reduce or cancel the user's speech. In some examples, a wake-up word spoken by the user 120 may be sufficiently short to be detected and trigger a freezing of adaptation by the adaptive filters. In some examples, multiple adaptive algorithms may operate in parallel upon each reference microphone signal such that an adaptive filter operates with frozen (or fixed) response (e.g., temporarily static filter weights/coefficients) for at least some duration of time. In some examples, adaptive filters acting upon reference microphone signals may operate with a delay in updating their filter response (e.g., a delay in updating a set of filter weights/coefficients), such that new acoustic signals (such as the user 120 starting to speak) provide components to the output signal during the time of the delay. Accordingly, in various examples, an output signal provided may include components of a user's speech that may be suitable for further processing by, e.g., speech recognition, virtual personal assistant, and other systems.

Figure 2B:
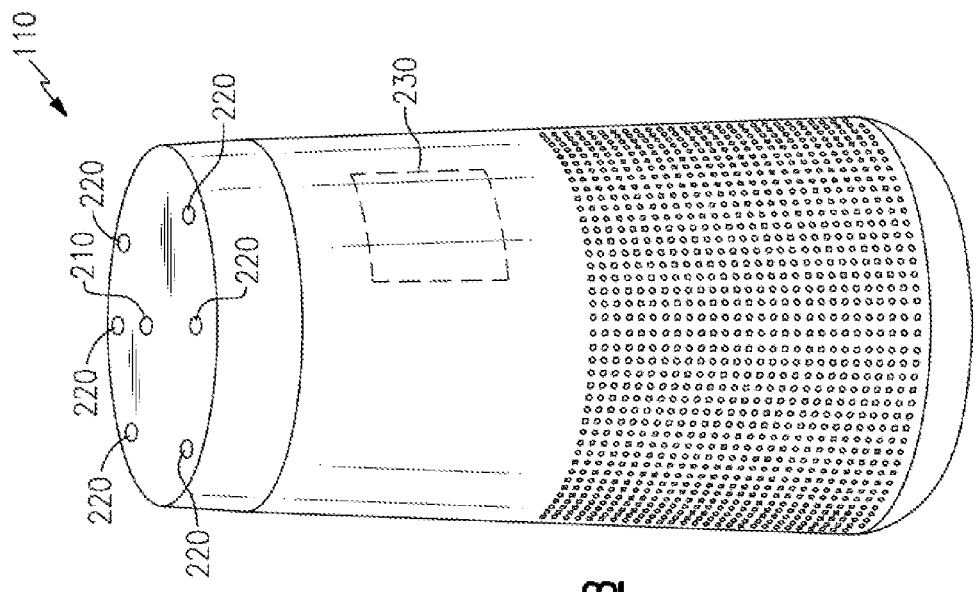
FIGS. 2A-2B are perspective views of various examples of an audio system.
Figure 2A:
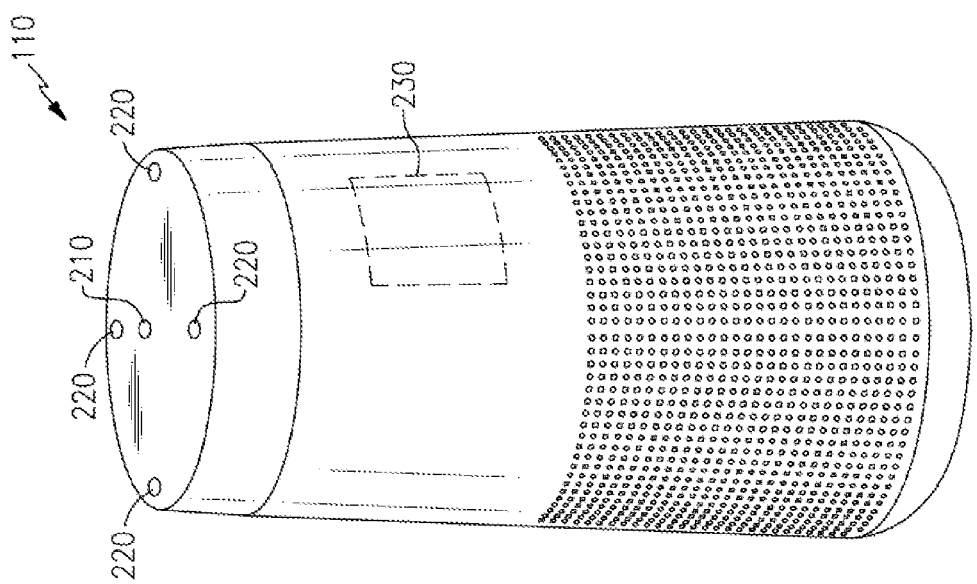

Each of FIGS. 2A and 2B illustrates an example audio system 110 having a primary microphone 210, a plurality of reference (or secondary) microphones 220, and a controller 230 that includes signal processing components/circuitry. In various examples, and as shown, the primary microphone 210 may be a central microphone. In other examples, a primary microphone may be any of the microphones shown or another microphone. In yet other examples there may be no particular primary microphone but there may be a primary signal derived or formed from the signals from multiple microphones, e.g., such as in a beam-forming arrangement or other array processing. The example audio systems 110 are shown having a particular form factor, but any of various form factors may be accommodated. Additionally, while FIG. 2A shows an example audio system 110 having four reference microphones and FIG. 2B shows an example audio system 110 having six reference microphones, any number of reference microphones, more or fewer than shown, may be suitable and may be included in various examples. Placement and/or arrangement of the various microphones 210, 220 may also be different. Various examples of the systems and methods described are insensitive to particular microphone placement. Further, some examples may include additional primary microphones and/or other microphones for various purposes.

While microphones are illustrated in the various figures and labeled with reference numerals, such as reference numerals 210, 220, the visual element(s) illustrated in the figures may, in some examples, represent an acoustic port wherein acoustic signals enter to ultimately reach a microphone 210, 220, which may be internal and not physically visible from the exterior. In examples, one or more of the microphones 210, 220 may be immediately adjacent to the interior of an acoustic port, or may be removed from an acoustic port by a distance, and may include an acoustic waveguide between an acoustic port and an associated microphone.

In some examples, the primary microphone 210 provides a primary signal. In some examples, a primary signal may be provided by combining signals from the microphones 210, 220, e.g., with array processing, to maximize an acoustic response in a direction from which the user is presumed to be speaking. In various examples, adaptive filters operate upon a plurality of reference signals (e.g., provided by the reference microphones 220) to produce a nullifying signal which is used to modify the primary signal to produce an output signal with a substantially null response, e.g., when the user is not speaking. Accordingly, when the user begins to speak the nullifying signal may fail to create a substantially null response (e.g., at least for some period of time) and the output signal may include components related to the user's speech.

Figure 3:
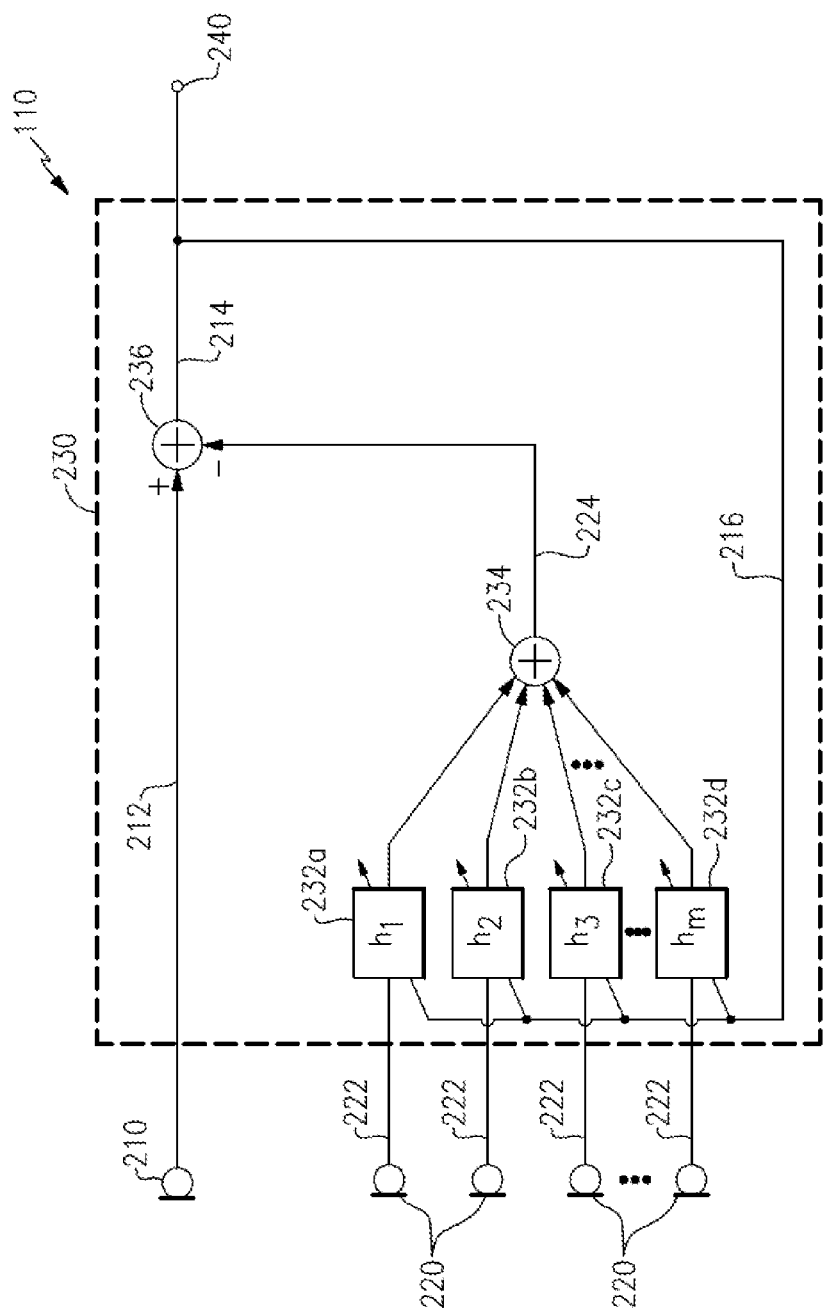
FIG. 3 is a schematic block diagram of an example audio system.

FIG. 3 illustrates at least one example of the audio system 110 that includes the primary microphone 210, reference microphones 220, and at least a portion of the controller 230 that includes null forming signal processing components/circuitry. The primary microphone 210 provides a primary signal 212, to include the user's voice when the user speaks but which may also include components from additional acoustic signals. Each of the reference microphones 220 provides a reference signal 222 including substantially the same content as the primary signal 212, but with differing arrival times, phases, and/or amplitudes. In various examples, the reference signals 222 may be used as noise references to reduce or remove from the primary signal 212 content associated with the acoustic environment generally, e.g., while the user is not speaking, and therefore not associated with the user's voice.

Each of the reference signals 222 may be processed through an adaptive filter 232, whose outputs are combined by a combiner 234 to produce a noise estimate signal 224, which is subtracted from the primary signal 212 by a combiner 236, to produce a voice estimate signal 214, which may be provided as an output signal 240. The adaptive filters 232 may include adaptive algorithms that monitor the voice estimate signal 214 (e.g., shown as a feedback signal 216) and may adapt the respective adaptive filter 232, e.g., at various intervals. The adaptive filter 232 may cause the noise estimate signal 224 to improve at reducing content in the voice estimate signal 214, particularly when the user 120 is not speaking. Accordingly, when the user 120 is not speaking, the audio system 110 converges to provide a nearly null output signal 240, effectively reducing or nullifying the acoustic sources in the environment from providing representative components to the output signal 240. The adaptive filters 232, considered as a whole, having their individual signals combined to be subtracted from the primary signal 212, may be referred to herein as a null former. Such a null former may include differing but similar arrangements of filters and adaptation, some examples of which are further described herein below.

In some examples, the audio system 110 itself may be an acoustic source in the environment. As described in more detail below, examples for which the audio system 110 includes playback components (e.g., audio input, amplifier, loudspeaker, etc.) the audio system 110 may process the playback signal and apply the playback signal as a reference signal to reduce components of its own playback (e.g., echo components) from the primary signal 212. In such examples, circuitry and components for reducing the echo component is referred to herein as an echo canceller.

The adaptive filters 232 may include adaptive algorithms that may be any number of adaptive algorithms known in the art, or other adaptive algorithms. In some examples, the adaptive algorithms may be any of a least mean square algorithm, a normalized least mean square algorithm, a recursive least mean square algorithm, or other algorithms, or may be a combination of any of these or other algorithms.

In various examples, the adaptive filters 232 may be configured to adapt during periods when the acoustic environment includes only noise sources (e.g., not including the user's voice or another desired signal) to determine appropriate filter responses (e.g., adapted weights, coefficients) to substantially reduce or remove noise content from the output signal 240, and to apply the adapted weights or coefficients (e.g., maintain them in operation in the filters 232) when a desired signal is present, e.g, when the user 120 speaks. In various examples, a time period may provide a period of fixed or maintained filter weights or coefficients, or a signal detection, such as a voice activity detection (VAD), may trigger a freeze of adaptation to provide a period of fixed or maintained filter weights, or a combination of these or other approaches may be applied. For example, the adaptive filters 232 may take some time to adapt to a changed acoustic environment, such as the user 120 beginning to speak, and such time may be sufficient to provide the user's voice content in the output signal 240. In other examples, additional or different time periods may be applied by selecting adaptation parameters, e.g., step size or adaptation constants, to produce relatively slow convergence and/or alternate adaptive algorithms, such as switching between multiple adaptive filters which adapt during disjoint time periods, for example. In some examples, detection of a desired signal may include voice activity detection, which may further include detecting a wake-up word, e.g., during a time period before the adaptive filters 232 adapt (and nullify) the changed acoustic environment (e.g., the user beginning to speak).

Some examples may include only a single reference microphone 220 to provide a single reference signal, which may be adaptively filtered by an adaptive filter 232, to provide substantial nullification to an acoustic environment. A change in the acoustic environment, such as a new desired signal, may provide components of the desired signal in an output signal, as previously discussed, even in such a single-channel (e.g., single reference microphone) example. In various examples, components of the desired signal may be included in the output signal while the adaptive filter(s) adapts or converges to the new acoustic environment (which may include a purposeful delay in convergence), and/or while the adaptive filter(s) is frozen by operation of background adaptation and/or signal activity detection or other mechanisms.

In some examples, the controller 230 may operate on various microphone signals in sub-bands, such that each of the various components of the controller 230 shown in FIG. 3 may include a number of sub-components, each sub-component receiving and/or operating upon only a particular sub-band portion of the various signals described. For example, and with reference to FIG. 4, each microphone 210, 220 may provide a signal to an optional sub-band filter 410, which separates spectral components of each microphone into multiple sub-bands, and an optional sub-band synthesizer 420 may re-combine the multiple sub-bands into a suitable output signal 240. Accordingly, for a system having "n" sub-bands, each of the "m" adaptive filters 232 shown represents "n" adaptive filters, one for each sub-band. Various examples may separate microphone signals into 8, 16, 32, 64, 128 or more sub-bands. In certain examples, a system having four (4) reference microphone channels (m=4) processed across sixty-four (64) sub-bands (n=64) may include a total of 256 (e.g., 4×64) adaptive filters 232, one per sub-band per channel.

In some examples, signals from each microphone may be processed in analog form but preferably are converted to digital form by one or more ADC's, which may be associated with each microphone, or associated with the sub-band filter 410, or otherwise act on each microphone's output signal between the microphone and the sub-band filter 410, or elsewhere, e.g., as part of the controller 230. Accordingly, in certain examples the various components act upon digital signals derived from each of the microphones. Any of the ADC's, the sub-band filter 410, and other components of the example audio systems 110 described herein may be implemented, for example, by a digital signal processor (DSP) configured and/or programmed to perform the various functions of, or to act as, any of the components shown or discussed.

As discussed above, signals may be separated into sub-bands by the sub-band filter 410 when received and re-combined by the sub-band synthesizer 420 when provided at an output. Each of the various components shown may therefore logically represent multiple such components to process the multiple sub-bands. Further, the sub-band filter 410 may process the microphone signals to provide frequencies limited to a particular range, and within that range may provide multiple sub-bands that in combination encompass the full range. For example, the sub-band filter may provide sixty-four (64) sub-bands covering 125 Hz each across a frequency range of 0 to 8,000 Hz. An analog to digital sampling rate may be selected for the highest frequency of interest, for example a 16 kHz sampling rate, to satisfy the Nyquist-Shannon sampling theorem, for example, for a frequency range up to 8 kHz. Various examples may include a narrower or broader frequency range and may include more or fewer sub-bands, or may not include sub-band processing, in accord with varying application and operational requirements. Sub-band filtering, processing, and synthesis may be included in any of the examples described herein without regard for whether such is illustrated in any particular figure. In various examples, various overlap add (OLA) or weighted overlap add (WOLA) methods with varying configuration parameters (such as windowing, window size, overlap length, etc.) may be implemented for sub-band filtering and synthesis.

Figure 4:
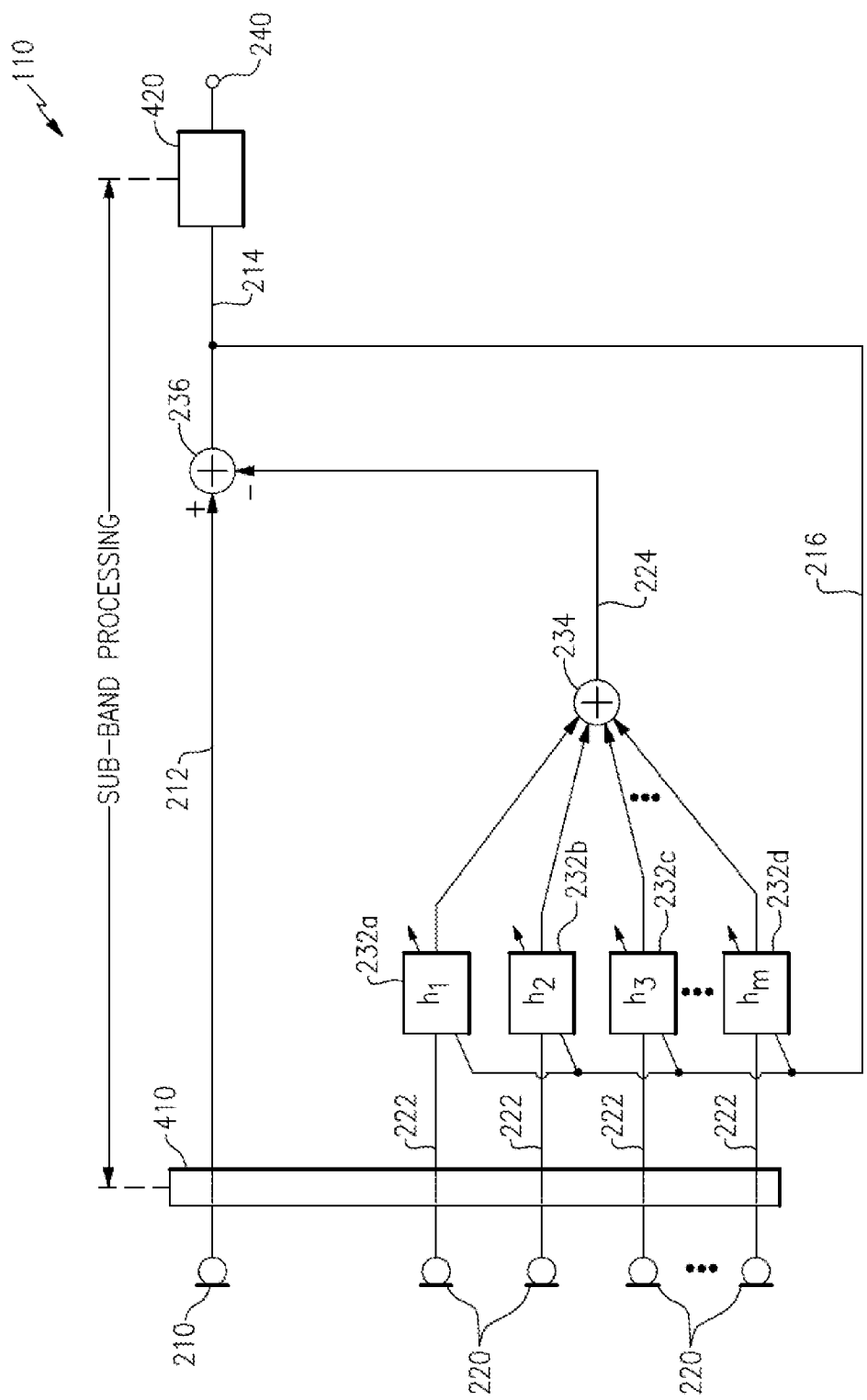
FIG. 4 is a schematic block diagram of an example audio system that includes an example of sub-band processing.

With continued reference to FIG. 4, the adaptive filters 232 may implement varying filter resolutions, or taps, across various examples to accommodate varying operational requirements in different environments. In various examples, the adaptive filters 232 may operate using 1 tap, 4 taps, 16 taps, 32 taps, or other resolutions. In some examples, a filter resolution may be selected in combination with a sub-band size, sampling rate, sampling bit depth, and/or other processing parameters to achieve various performance characteristic(s).

In various examples, a convergence time for the adaptive filters 232 may be sufficient for a command or instruction spoken by the user 120 to be provided in the output signal 240, prior to the adaptive filters 232 forming a new null (e.g., minimizing an energy response at the output signal) that may reduce or cancel the user's speech. For example, some adaptive filters 232 may include a convergence time of around 1 second. In other examples, a convergence time of the adaptive filters may be purposefully lengthened or delayed. For example, each of the adaptive filters 232 (with reference to FIGS. 3-4) includes a filter that filters a respective signal from a reference microphone 220, and an adaptive algorithm that updates, or adapts, the filter, as discussed above. A slowed convergence of each of the adaptive filters 232 may, in some examples, provide additional time for a command or instruction spoken by the user 120 to be provided in the output signal 240. For example, each of the adaptive algorithms associated with a respective adaptive filter 232 may be tuned (e.g., by adjusting a step size or other adaptation constant, for instance) or adjusted to de-sensitize its response to changes in the acoustic environment, thus slowing its convergence rate, e.g., lengthening a time the adaptive filter 232 takes to adapt. Such a convergence delay may be selected or designed to provide a convergence time of 3 seconds, 5 seconds, 8 seconds, or more in various examples.

Figure 5:
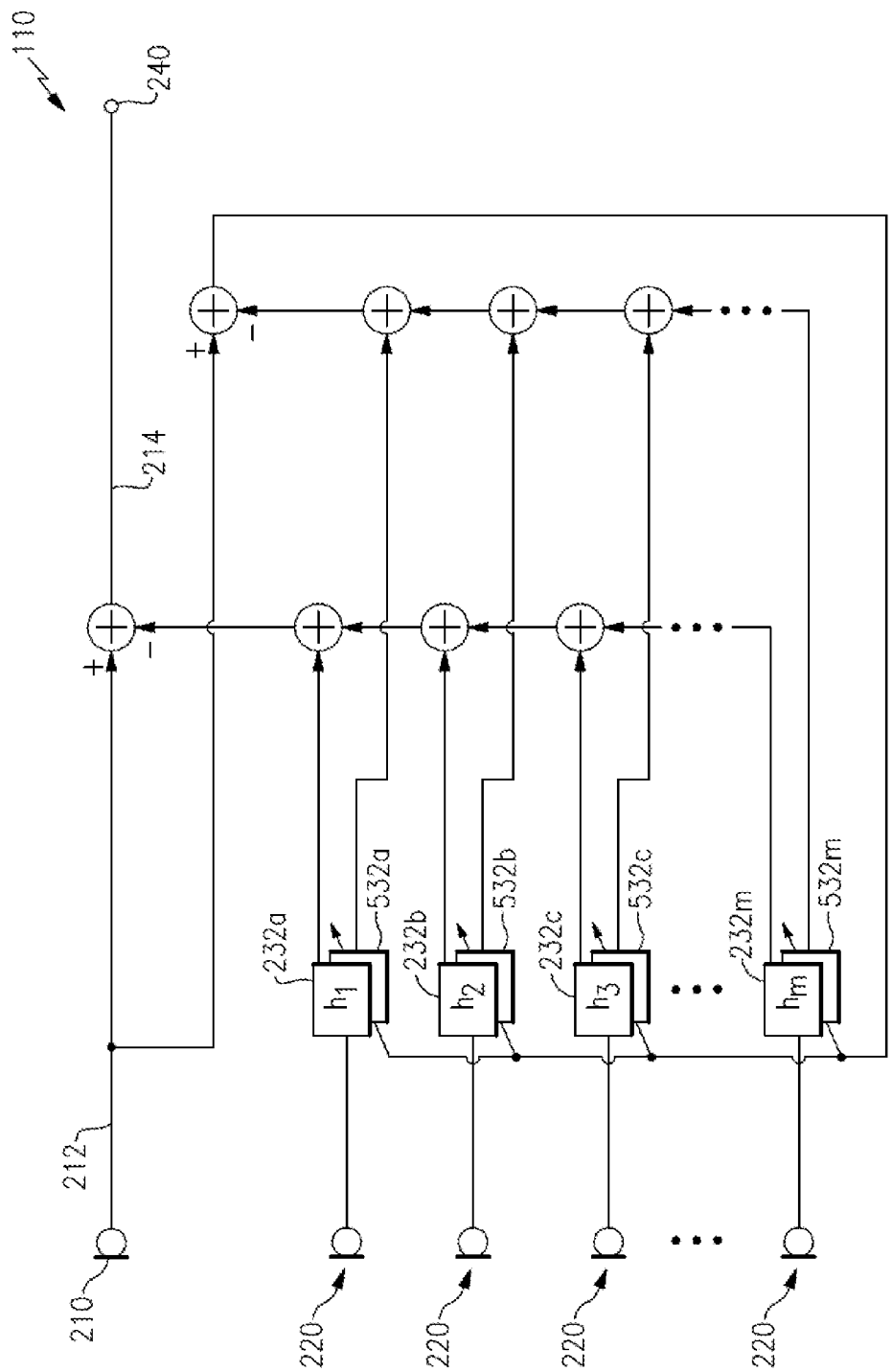
FIG. 5 is a schematic block diagram of an example audio system that includes an example of background adaptation.

In various examples, the adaptive filters 232 may include multiple adaptive filters per microphone 220 (e.g., per channel) (and in the case of sub-band processing, per sub-band) such that each (sub-band) channel includes an active filter and a background filter. The active and background adaptive filters may exchange functions, from active to background and vice-versa, at intervals, to create various intervals during which a desired signal, such as a user's voice, may not be adapted, reduced, nulled, or canceled by action of the adaptive filters 232. With reference to FIG. 5, a schematic diagram of an example system 110 that includes active and background adaptive filters is illustrated.

FIG. 5 shows an example audio system 110 in which signals from each reference microphone 220 may be processed by an active adaptive filter 232 and by a background adaptive filter 532. In some examples, the background adaptive filter(s) 532 may continuously adapt to minimize the response of an error signal 516, while the active adaptive filter(s) 232 maintain a fixed (or frozen) set of filter weights to provide a fixed response of an output signal 240, at least for a period of time. At various time intervals, such as a fixed interval of 3 seconds, 5 seconds, or 8 seconds or more in various examples, filter weights from the background adaptive filter 532 may be copied to the active adaptive filter 232. In some examples, the operation of the active and background adaptive filters 232, 532 may be swapped, such that the background adaptive filter 532 becomes active and frozen, and the active adaptive filter 232 begins to adapt its filter weights as a background adaptive filter.

In some examples, whenever the filter weights of an active adaptive filter are changed (e.g., copied from the background adaptive filter), the background adaptive filter may be re-set to begin adaptation from a newly non-adapted state. In other examples, the background adaptive filter may continue adaptation from the previously adapted filter weights without re-setting.

In some examples, the active adaptive filters 232 may be updated on the basis of criteria other than fixed intervals. For example, the active adaptive filters 232 may be updated by, e.g., copying weights from the background adaptive filters 532, whenever the background adaptive filters 532 have reached a particular level of convergence. In certain examples, the background adaptive filters 532 adapt from a re-set state and when the adaptation is sufficiently complete, e.g., by the filter weights not changing, or changing by less than a threshold and/or fractional amount, the filter weights may be copied over to the active adaptive filters 232. In some examples, the background adaptive filters 532 may be re-set after copying their weights to the active adaptive filters 232. In other examples, the background adaptive filters 532 may continue to adapt and may copy their weights to the active adaptive filters 232 at a later time, based upon, e.g., a threshold change to the weights and/or a threshold convergence after such a change to the weights. Accordingly, the active adaptive filters 232 may operate with relatively fixed filter weights for various intervals, the various intervals may be fixed intervals by design or may be intervals based upon various criterion of the background adaptive filters 532, such as a convergence criteria of the background adaptive filters 532 and/or a threshold change having occurred in the weights of the background adaptive filters 532. In each of these example cases, a fixed response of the system may be sufficiently long (e.g., in time) for a desired signal to be provided and/or detected in the output signal 240.

In various examples, the various adaptive filters 232 may be frozen upon detection of the desired signal, such as when the user 120 is speaking, and accordingly may allow the desired signal to be provided in the output signal 240 for a period of time following such detection. For example, a voice activity detector may monitor the estimated voice signal 214 and send a signal to the adaptive filters 232 to pause adaptation upon detecting voice activity in the voice estimate signal. In certain examples, a wake-up word may be short enough in duration, relative to a convergence time of the adaptive filters 232, to be detected in the estimated voice signal 214 and signal the adaptive filters 232 to pause adaptation. Accordingly, in some examples, a voice activity detector may be a wake-up word detector.

Figure 6:
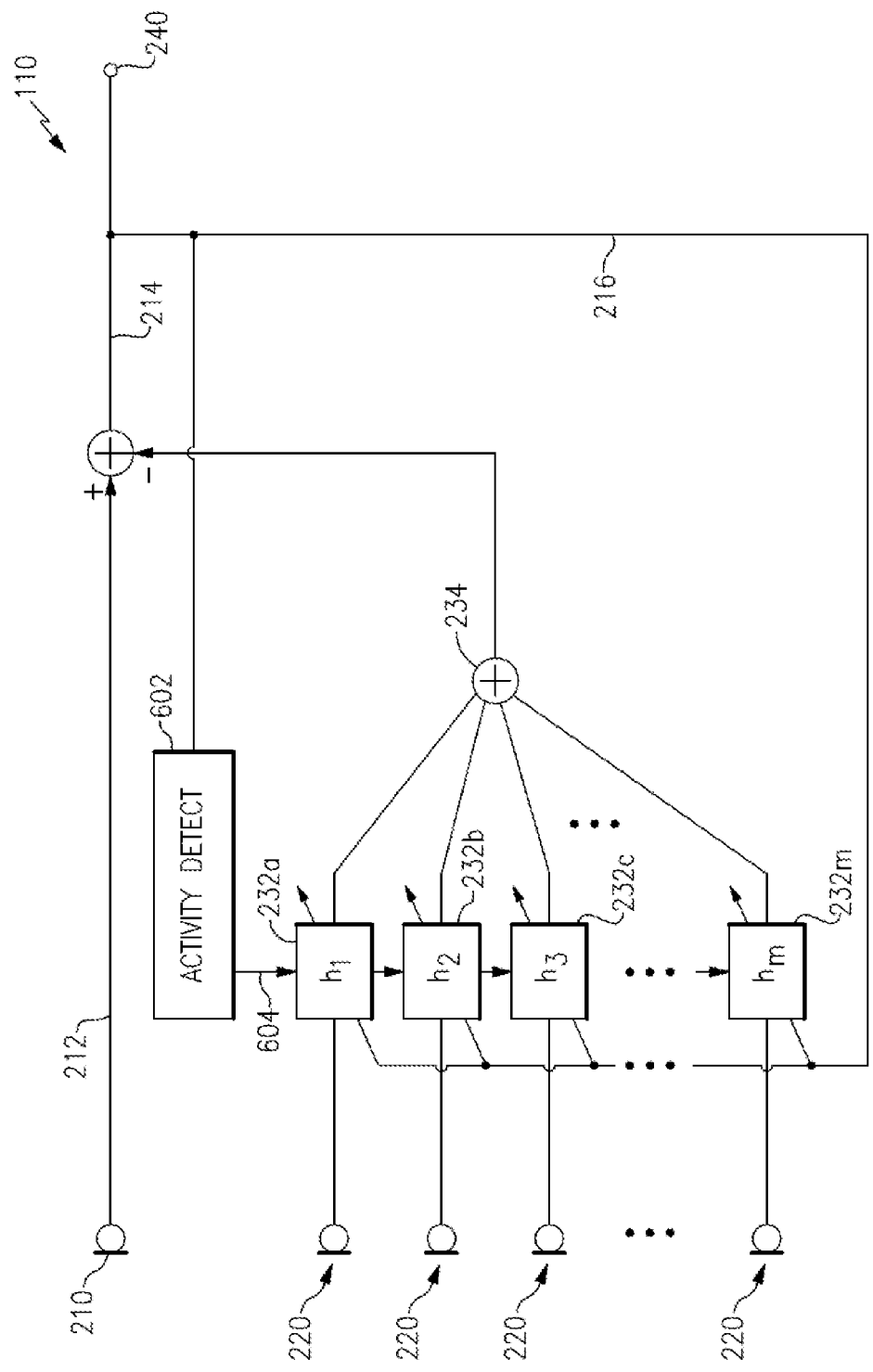
FIG. 6 is a schematic block diagram of an example audio system that includes an example of activity detection.

With reference to FIG. 6, an example audio system 110 that includes signal activity detection is illustrated. The adaptive filters 232 may be controlled to pause adaptation while continuing to filter signals based upon the most recent filter weights or coefficients. The activity detector 602 may control when the adaptive algorithms (associated with the adaptive filters 232) are paused. For example, the activity detector 602 may monitor the output signal 240 for an indication of a desired signal, such as a particular spectral content, or the presence of a wake-up word, or other criteria, and upon detecting the desired signal activity the activity detector 602 may send a signal 604 to each of the adaptive filters 232 to pause (or freeze) adaptation of its respective filter weights or coefficients. In some examples, each of the adaptive filters 232 may be configured to use filter weights or coefficients that were calculated just prior to the desired signal being detected. In various examples, the activity detector 602 may generate the signal 604 to pause adaptation for a certain period of time, such as 3 seconds, 5 seconds, 8 seconds, or more. In other examples, the activity detector 602 may generate the signal 604 only while the desired signal continues to be detected. In other examples, the adaptive algorithms may be configured to pause adaptation for the certain period of time upon receiving the signal 604, or a period of time may be enforced in other ways.

In various examples, an activity detector, such as the activity detector 602, may monitor other aspects of the audio system 110 in addition to or instead of monitoring the output signal 240. For example, an activity detector 602 may calculate a correlation between the primary signal 212 and the noise estimate signal 224 and may monitor the correlation for changes. A change in the acoustic environment may cause the correlation between the primary signal 212 and the noise estimate signal 224 to change, thus the activity detector 602 may incorporate such a change in correlation into a decision whether a desired signal is present. Additionally, once converged, the weights applied by, e.g., the adaptive filters 232 may remain substantially constant so long as the acoustic environment remains unchanged. A change in the acoustic environment, such as the presence of a desired signal, e.g., a user speaking, causes the adaptive filters 232 to begin to adjust the weights applied. Accordingly, a new or significant change to the weights of the adaptive filters 232 may indicate a change in acoustic environment, which may be related to a desired signal. The activity detector 602 may incorporate such into a decision whether a desired signal is present, and if so, pause further adaptation and/or revert to filter weights in use just before the change occurred.

In various examples, any of the elements particularly described above with reference to FIGS. 3-6 may be combined for advantageous effect. For example, delayed adaptation may provide a slowed convergence time in which a desired signal (e.g., voice activity, a wake-up word) may be detected, as illustrated in FIG. 6, to trigger a pause in adaptation. Further, active and background adaptive filters as illustrated in FIG. 5 may be paused by a signal from an activity detector as illustrated in FIG. 6. Further as described above, sub-band filtering, processing, and synthesis may be incorporated into any one or combinations of aspects illustrated by FIGS. 3-6. Additionally, alternate systems and methods of providing a primary signal may be combined with any of the aspects of sub-band filtering, processing, synthesis, convergence times, background adaptation, and activity detection. At least one example of alternately providing a primary signal is described with reference to FIG. 7

Figure 7:
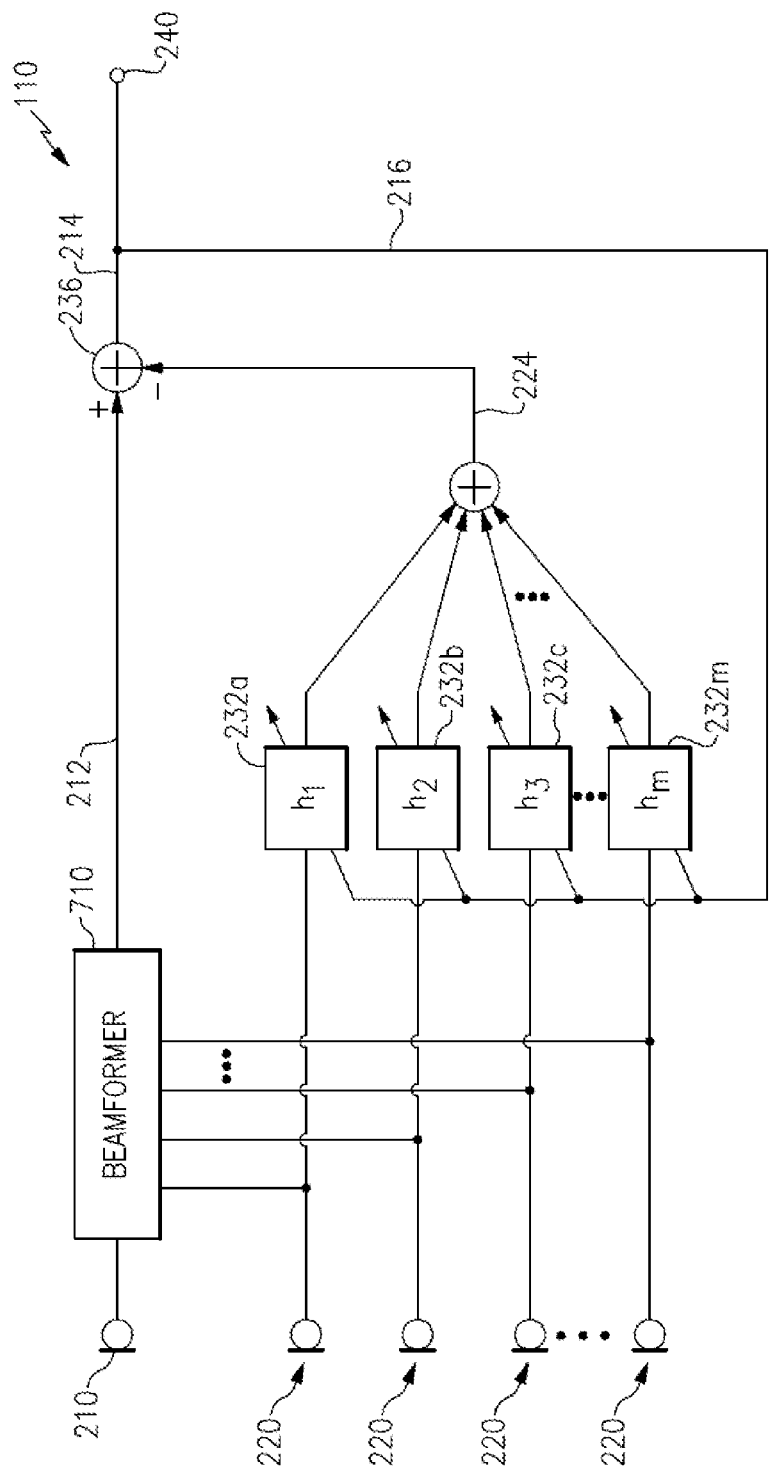
FIG. 7 is a schematic block diagram of an example audio system that includes an example of beamforming to provide a primary signal.

FIG. 7 illustrates an alternate example audio system 110 wherein the primary signal 212 is provided by action of a beamformer 710. Any of the microphones 210, 220 may provide signals to the beamformer 710 that may apply array processing to steer a beam (e.g., a direction of enhanced acoustic response) toward an expected location, e.g., of the user 120. In some examples, multiple sets of beamforming weights (e.g., one set for each of various directions) may be pre-configured (e.g., stored in memory), and a selected set of the beamforming weights may be applied by the beamformer 710. Operation of the adaptive filters 232 may be independent of the method or system applied to provide the primary signal 212, and therefore any of the above described operations of the adaptive filters 232, sub-band processing, convergence times, active and background adaptation, and activity detection, with reference to FIGS. 3-7, may be advantageously applied to the example audio system 110 of FIG. 7. Indeed, the example audio system 110 illustrated in FIG. 7 may be a general case of the example audio system 110 illustrated in FIG. 3, e.g., a beamformer 710 in FIG. 7 that selects and provides a signal from the primary microphone 210 and rejects signals from the reference microphones 220 reduces to the specific case illustrated in FIG. 3.

Various examples of systems and methods in accord with those described herein may include detection of various characteristics of the noise field of the acoustic environment. For example, adaptive systems and methods as described herein may exhibit more robust performance in an acoustic environment having dominant discrete acoustic noise sources and exhibiting high levels of coherence between the various microphones. Systems and methods described herein operating in a more diffuse acoustic field may operate more robustly by including beamforming techniques such as those described with reference to FIG. 7. Accordingly, some examples detect whether a noise field of the acoustic environment exhibits more discrete characteristics or more diffuse characteristics, and may select various operating parameters based in part upon the noise field detection. For example, use and operation of beamforming to provide a primary signal, aggressiveness of adaptive filters (e.g., convergence times), and/or whether to pause or freeze adaptation for a period of time, may be based upon detection of noise field characteristics, in some examples. For instance, some examples may use beamforming to provide the primary signal and less aggressive adaptation when the noise field is detected to be more diffuse, and may use an omni-directional microphone to provide the primary signal and more aggressive adaptation when the noise field is detected to be more discrete. Determination of the diffusivity of the noise field may be determined, in some examples, by calculating or determining a magnitude-squared coherence between various microphone channels. In some examples, a magnitude-squared coherence is determined for frequencies expected to have a low coherence for diffuse noise fields, e.g., nulls in a characteristic sinc function.

Various examples of systems and methods in accord with those described herein may include one or more acoustic drivers for the production of acoustic signals from one or more program content signals. For example, an audio system may include one or more loudspeakers in addition to multiple microphones, such as the microphones 210, 220 of any of the above described example audio systems, or combinations or alternatives thereof, and may receive a program content signal for playback as an acoustic signal. Such an audio system may be a speakerphone system, a portable speaker, a virtual assistant device, a soundbar, etc. and may be coupled via a wireless connection, e.g., Bluetooth™ or wi-fi, or a wired connection, e.g., optical, coaxial, Ethernet, using any of various protocols and/or signal formats, to audio signal sources, such as a smartphone, a television, a remote server, or the like. The loudspeaker(s) of the example audio system described may be an alternate audio source providing acoustic signals that are not desired to be part of an output signal, e.g., the output signal 240. In some examples, operation of the adaptive filters 232 upon signals from the reference microphones 220 may sufficiently reduce audio program content (e.g., from the program content signal(s) being converted to one or more acoustic signals by one or more loudspeakers) from the primary signal 212 to provide a sufficient output signal 240. In other examples, an echo cancellation subsystem may be included that removes some or all of the rendered program content from the primary signal 212 or from one or more of the reference signals 222 to substantially remove or reduce components of the program content signal from being present in the output signal 240.

Figure 8:
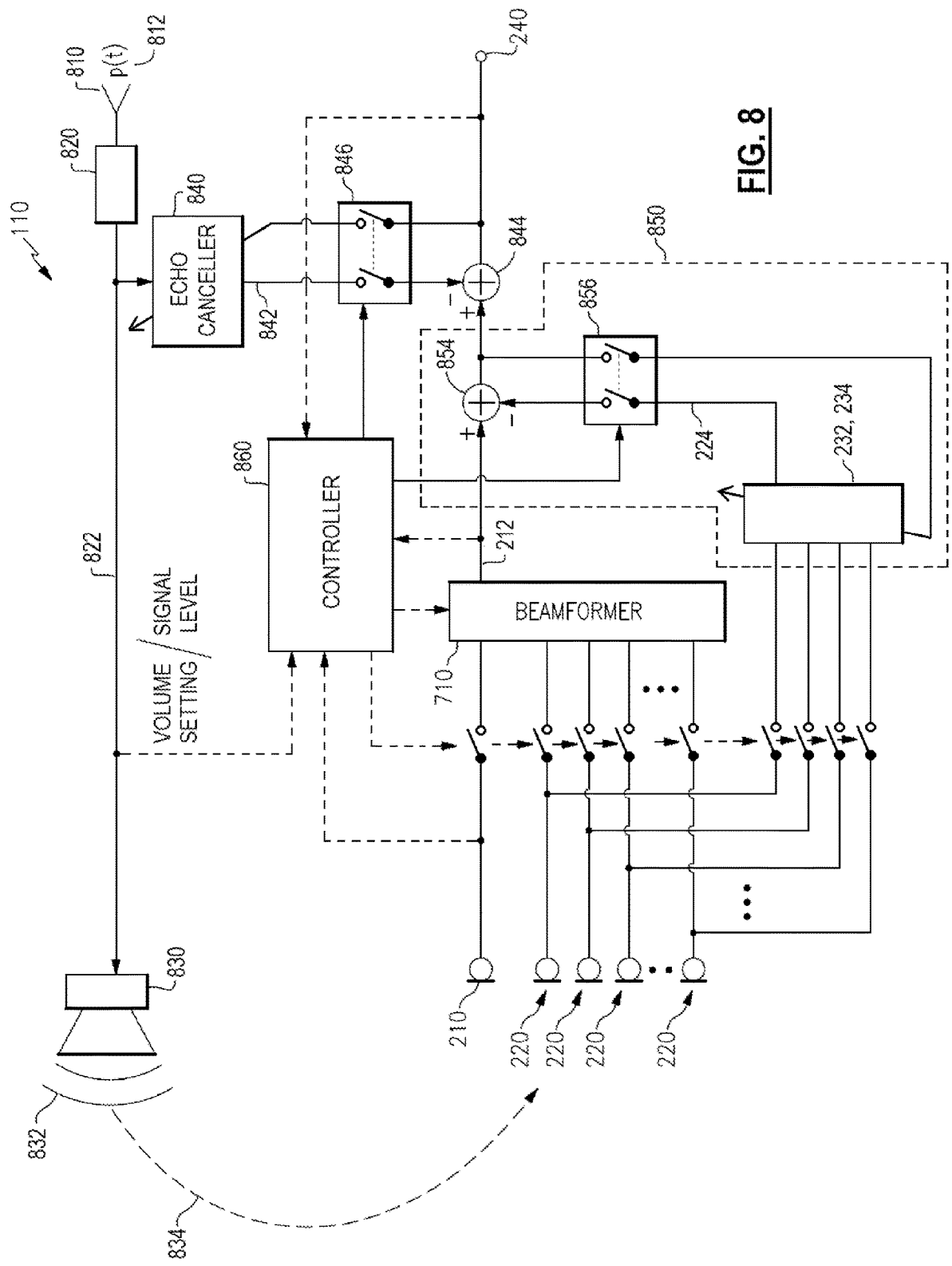
FIG. 8 is a schematic block diagram of an example audio system that includes an example echo cancellation system and controller.

FIG. 8 illustrates a further example audio system 110 that incorporates an audio playback system and includes echo cancellation to reduce echo components (caused by the playback) from a primary signal to provide an output signal. The example audio system 110 of FIG. 8 is similar to those described above and substantially similar to FIG. 7 in that it includes the beamformer 710 and a null former (here referenced as null former 850), and further includes an input 810, processing circuitry 820, at least one loudspeaker 830, and an echo canceller 840. In various examples, a playback signal 812 may be received at the input 810 and processed by the circuitry 820 to perform various processing, e.g., equalization, filtering, amplification, etc., and to provide a driver signal 822 to the loudspeaker 830. The loudspeaker 830 may transduce the driver signal 822 into a playback acoustic signal 832.

In various environments and/or under various operating conditions, a feedback or echo path 834 may exist that couples the playback acoustic signal 832 to one or more of the microphones 210, 220. Such echo path 834 may include, in various examples, direct and reflected acoustic paths as well as physical coupling between the loudspeaker 830 and the microphones 210, 220, e.g., through an enclosure or chassis of the audio system 110.

Similar to above described examples of the audio system 110, the example audio system 110 of FIG. 8 includes a primary signal 212, provided from one or more of the microphones 210, 220, which may be formed by a beamformer 710 in some instances, or in some examples or under certain operating conditions may be provided by the primary microphone 210. Selection of the primary microphone 210 or a combination to the microphones 210, 220, e.g., by the beamformer 710, to provide the primary signal 212, may be at the control of a controller 860. Further, functionality of the beamformer 710, such as selection of microphones 210, 220 and combinatorial weighting of the microphone inputs, and resulting acoustic pattern e.g., beam steering and/or null steering, may be at the control of the controller 860.

In various examples, the echo canceller 840 may receive the driver signal 822 as a reference signal to produce an estimated echo signal 842 that may be subtracted from the primary signal 212 by a combiner 844. In other examples, the echo canceller 840 may receive the playback signal 812 (e.g., without processing) or may receive an intermediate signal (e.g., some processing applied but not yet the driver signal 822) as a reference signal. Accordingly, some of the processing circuitry 820 may operate on the playback signal 812 prior to providing a reference signal to the echo canceller 840 while additional portions of the processing circuitry 820 may operate after. The echo canceller 840 may be any kind of acceptable echo canceller, as known in the art. Some examples may include further processing means (not shown) to reduce residual echo, such as by post-filtering, spectral subtraction, or other processing means as may be known in the art.

In various examples, the audio system 110 includes a null former 850 that receives a number of signals from one or more of the reference microphones 220 to provide a noise estimate signal 224 that may be subtracted from the primary signal 212, by a combiner 854. Details of the arrangement and operation of the null former 850 may be similar to any of the above described null forming arrangements in FIGS. 4-7, or their equivalents.

In various examples, the controller 860 may selectively enable or disable each of the echo canceller 840 and the null former 850, as illustrated by switches 846, 856, respectively. The switches 846, 856 are illustrative only and generally do not represent physical switches but rather represent control over signal flow paths, such as may be accomplished via a digital signal processor (DSP) or other suitable processing circuitry and as may be incorporated into or a part of the controller 860. Further, in some examples, each of the processing circuitry 820, the beamformer 710, the echo canceller 840, and the null former 850, or any combination of these, may be considered to be part of the controller 860, as may each of the combiners 844, 854.

In various examples or under various operating conditions, the echo canceller 840 may sufficiently reduce undesired components of the primary signal 212. Such may be the case, for instance in a relatively quiet environment where the audio system 110 itself, via the loudspeaker 830, is a significant source of the undesired components. Alternately stated, if an echo from the playback acoustic signal 832 is a significant portion of the undesired components, the echo canceller 840 may be sufficient to provide a suitable output signal 240. In such cases, the controller 860 may enable the echo canceller 840, e.g., via the switch 846, and may disable the null former 850, e.g., via the switch 856.

In other examples or under other operating conditions, the echo canceller 840 and the null former 850 may both be enabled by the controller 860 to achieve suitable reduction of undesired components from the primary signal 212. For instance, there may be additional acoustic sources that produce undesired noise, e.g., not the user's speech. In such an instance, the echo canceller 840 may be enabled to reduce echo components but may be incapable of suitably reducing additional undesired noise, e.g., because the echo canceller 840 does not have a reference signal correlated to the undesired noise. The null former 850, however, may be enabled in addition to the echo canceller 840 such that the null former 850 reduces undesired noise components in one of the various manners described above with respect to FIGS. 4-7, or their equivalents.

In yet other examples or under yet other operating conditions, the null former 850 may sufficiently reduce undesired components of the primary signal 212. Such may be the case, for instance, if the audio system 110 isn't playing back audio (thus no echo components) or if the audio system 110 is playing back audio at a relatively high volume. Under high playback volumes, various non-linearities in the playback audio path may cause the echo canceller 840 to perform less optimally than at lower, more linear, playback volumes, e.g., because the echo is less related to the playback signal 812 at high listening volumes. Accordingly, in such instances the null former 850 may perform better at reducing both the noise and echo components from the primary signal 212. In some examples, feedback and/or echo of the playback acoustic signal 832 may thereby be characterized as a unique acoustic source in that the feedback/echo component is less correlated to the playback signal 812.

Under various playback conditions and environmental conditions, the controller 860 may enable or disable either of the echo canceller 840 or the null former 850, variously to optimize the reduction of undesired components from the output signal 240. For example, the echo canceller 840 may work well to reduce echo content at typical playback volumes, but may perform less optimally at a high playback volume (as discussed above) and may not appreciably reduce noise from other sources. Meanwhile, the null former 850 may work well to remove other noise sources but may be less effective at reducing echo components than the echo canceller 840 (e.g., at regular playback volumes), or may not be necessary in relatively quiet environments. Accordingly, the controller 860 may make various assessments of how effective is each of the echo canceller 840 and/or the null former 850, and may make adjustments to either, including disabling (or enabling) each, to provide improved reduction of undesired components in the output signal 240. In some examples, the controller 860 may also adjust the beamformer 710 in response to the overall performance of the audio system 110. Accordingly, the controller 860 may adapt the audio system 110 to the current playback conditions and listening environment to seek an optimal operating configuration for reduction of undesired components in the output signal 240.

For instance, in at least one example, the controller 860 may assess a user's playback volume settings or a signal level (e.g., the driver signal 822) and may determine or be pre-configured that above a certain playback volume (e.g., a threshold) the echo canceller 840 performs less well, and as a result the controller 860 may disable the echo canceller 840. If and when the playback volume is reduced, the controller 860 may re-enable the echo canceller 840. Similarly, in some examples, the controller 860 may disable the echo canceller 840 at particularly low volume settings (e.g., below a second threshold), because echo components may be substantially absent below various playback levels.

In some examples, the controller 860 may be configured to detect, determine, or assess performance of the echo canceller 840 at various times and may enable, disable, or otherwise control the operation of the echo canceller 840. In some examples, the controller 860 may compare signal energy levels before and after operation of the echo canceller 840 to assess the performance of the echo canceller 840. A significant reduction in the energy level may indicate that the echo canceller 840 is removing significant echo content, e.g., working well. If the energy level is not significantly reduced by the echo canceller 840, such may indicate a highly noisy environment (significant acoustic components not related to playback echo) and/or non-linearities (such as at high playback volumes) in the echo path, and/or may indicate a relatively low playback volume such that there is simply not much echo content in the microphone signals. In at least one example, the controller 860 may compare the energy level of the primary signal 212 (or equivalent signal provided to the echo canceller 840) to the energy level of the output signal 240 (or equivalent signal output from the echo canceller 840).

In some examples, the controller 860 may assess the energy level of the signal output from the echo canceller 840 on an absolute basis, e.g., without regard for the input signal provided to the echo canceller 840. For example, a high absolute signal energy output from the echo canceller 840 may indicate conditions in which the echo canceller 840 is not as effective (as compared to other conditions). As a result, the controller 860 may disable or alter operation of the echo canceller 840.

In various examples, the controller 860 may not be limited to only controlling an enabled or disabled state of the echo canceller 840. The controller 860 may incorporate intermediate operating conditions for the echo canceller 840. For example, controller 860 may alter operation of the echo canceller 840, e.g., to be more or less aggressive. Alternately stated, the controller 860 may control numerous enabled states of the echo canceller 840, a currently enabled state selected by the controller 860 based upon performance of the echo canceller 840, playback volume, or other criteria.

In various examples, the controller 860 may assess or determine an effectiveness of the null former 850 and may enable or disable the null former 850 as a result, or may control various intermediate operating states of the null former 850 in some examples. Similar to the signal energy considerations discussed above with respect to the echo canceller 840, the controller 860 may assess a relative change in energies between the signal(s) provided to the null former 850 and the signal output from the null former 850, and the controller 860 may disable, enable, or adjust the null former 850 as a result. In some examples, the controller 860 may evaluate the absolute energy of the signal output from the null former 850 (e.g., without regard to the signal(s) provided to the null former 850), and may control the null former 850 as a result.

In various examples, the controller 860 may determine the performance of either of the echo canceller 840 and the null former 850 while both are enabled, or may determine performance of each in the absence of the other. Accordingly, in some examples, the controller 860 may disable the echo canceller 840, at least temporarily, to determine the performance of the null former 850. Vice versa, the controller 860 may disable the null former 850, at least temporarily, to determine the performance of the echo canceller 840. As a result of the determinations, the controller 860 may enable only the echo canceller 840 or only the null former 850, or both.

In at least some examples, the controller 860 may be configured to assess the operation of the echo canceller 840 and if it is working well (such as providing a significant reduction in signal energy content, or such that the output signal 240 has sufficiently reduced undesired content, e.g., as may be quantified by absolute or relative signal energies), the controller 860 may disable the null former 850. In other words, if the echo canceller 840 is working sufficiently, the null former 850 may be turned off by the controller 860. On the other hand, if the echo canceller 840 is not performing sufficiently, the controller 860 may enable the null former 850, in addition to or instead of the echo canceller 840.

In some examples, the echo canceller 840 may substantially always be in operation and the controller 860 may assess whether significant undesired content nonetheless exists in the output signal 240 (which may be determined by absolute signal energy or signal energy relative to the microphone signal(s) and/or the primary signal 212, as discussed above), and if so, the controller 860 may additionally turn on (enable) the null former 850.

While FIG. 8 illustrates an echo canceller operating on a signal after the operation of a null former, in some examples one or more echo cancellers may operate on one or more microphone signals before being provided to a null former.

Figure 9:
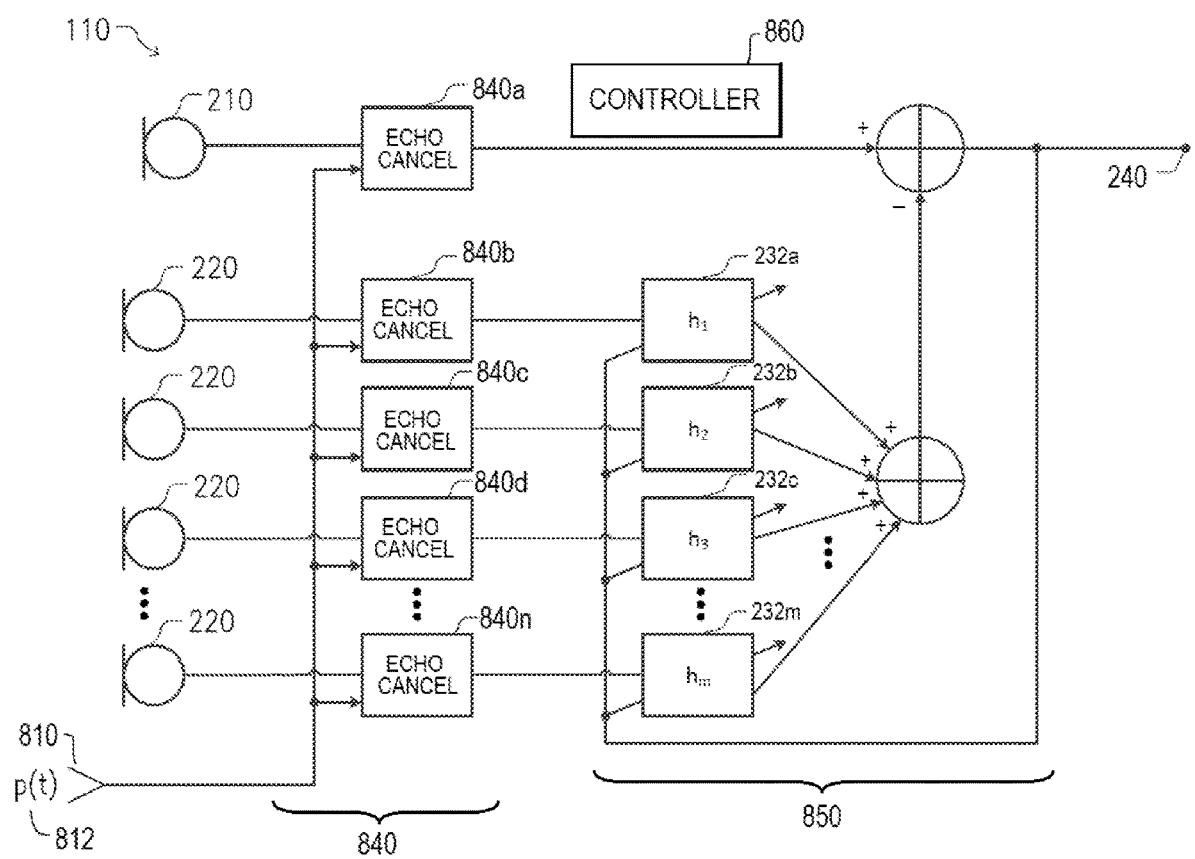
FIG. 9 is a schematic block diagram of another example audio system that includes an example echo cancellation system and controller.

FIG. 9 illustrates an alternate example audio system 110 that includes echo cancellation, similar to that of FIG. 8, except that the each of a number of echo cancellers 840 operate on signals from the microphones 210, 220 prior to operation of the null former 850. A controller 860 may control the echo canceller(s) 840 and the null former 850 in various manners similar to those described above. In some examples, a beamformer (not shown in FIG. 9) may combine one or more of the signals from the microphones 210, 220, and one or more echo cancellers 840 may operate before or after beamforming.

In various examples in accord with those described herein and with reference to FIGS. 8-9, one or more echo cancellers 840 may operate upon a reference playback signal to generate an estimated echo signal, and one or more null formers 850 may operate upon one or more reference microphone signals to generate an estimated noise signal, for reduction of echo and noise content, in either order, from an output signal. A controller 860 may monitor any of a playback volume and/or various signal energies to determine if either of the echo canceller(s) 840 or null former(s) 850 are performing well or not and may disable, enable, or modify the operation of any of the echo canceller(s) 840 or null former(s) 850 as a result.

In various examples, an audio system 110 in accord with those examples of FIGS. 8-9 may accommodate the playback signal 812 being a mono signal (i.e., a single channel) or a multi-channel signal, for example left/right stereo audio, 3.1 surround sound audio, 5.1 surround sound audio, 7.1 surround sound audio, etc. Accordingly, the echo canceller(s) 840 may perform monophonic or multi-channel echo cancellation to remove some or all of the rendered program content from the signal upon which each operates.

In various examples, the controller 860 may control which microphone signals are used and provided to any of the beamformer 710, null former 850 and/or echo canceller(s) 840. For example, a number of microphones 210, 220 being used may be adjusted by the controller 860. In some examples, the controller 860 may reduce the number of microphones 210, 220 in use when the environment is less noisy and/or the playback volume is relatively low.

For example, in a less noisy environment, the null former 850 may be disabled and the echo canceller 840 may be more effective when operating with fewer microphones, e.g., the total echo content may be reduced when fewer microphones are used to provide the primary signal 212.

In other examples, one or more of the microphones 210, 220 may exhibit higher coupling to the loudspeaker 830, either by physical arrangement of the components of the audio system 110 and/or by placement or orientation of the audio system 110 in the environment. Accordingly, the controller 860 may disable or discontinue using one or more of the microphones 210, 220 to reduce the total echo content. For example, the controller 860 may evaluate signals from one or more of the microphones to determine an amount of correlation to the playback signal 812, for instance, and disable or discontinue use of any of the microphones 210, 220 that have high correlation to the playback signal 812, e.g., have high echo content. Similarly, one or more of the microphones 210, 220 may exhibit less correlation to the primary signal 212 under certain condition, such as due to varying orientation and/or placement of the audio system 110 in the listening environment, and the controller 860 may disable or discontinue use of such a microphone 210, 220.

As described briefly above, the microphone designated as a primary microphone 210 may be arbitrary, e.g., the controller 860 may select any of the microphones to be a primary microphone 210 at any given time, and may select one of the microphones based upon the lowest correlation to the playback signal 812 (e.g., least echo content), the lowest energy overall (e.g., the least noise and echo content), or other factors. Further, when a beamformer 710 is in operation, the audio system 110 may be considered to not have a primary microphone but rather simply a plurality of microphones. Accordingly, in some examples, the primary microphone 210 may be considered a further one of, or none of, the reference microphones 220, and for example signals from the microphone labeled as microphone 210 in various figures may also be provided to a null former as a reference signal, e.g., treated as a reference microphone 220.

In various examples, audio systems in accord with those herein may include multiple audio systems 110 and multiple groups of microphones, each of which may share one or more components, such as a controller 860, or may operate in isolation from each other, to generate two or more output signals. Such audio systems may monitor and evaluate the two or more output signals to, e.g., detect the presence of desired content as described above, and/or to select one of the output signals to provide as the ultimate output signal. In other examples, two or more such output signals may be combined in various ways to provide the ultimate output signal. In at least one example, an audio system having at least one expansive dimension, such as a sound bar, may include two clusters of microphones 210, 220, each supporting operation as two audio systems 110, and accordingly acting to "listen" to two regions of a room, such as when located at opposing ends of such a sound bar.

Various examples of the systems and methods in accord with those described herein may include variations to operation, components, and features based upon application or environment. For example, an audio system designed for portable use may include an option to operate from battery power at times, and the number of reference microphones (e.g., adaptive channels), adaptive filters, sub-bands, sampling frequency, and the like, may be selected or may be adapted to reduce power consumption in certain examples. In some examples, tradeoffs to reduce power consumption may be made on the fly by the system, and may include trading off performance in terms of noise reduction for an extended operating time (e.g., battery life). Such options may be configurable by the user in certain examples. Additionally, such options may be changed over time, e.g., as a battery charge level reduces below one or more thresholds, for example. An audio system expected to be used in a more fixed environment, such as a home or office speaker that may be plugged in and may be expected to remain in a fixed position for an extended period of time, may be designed for more robust operation at the expense of increased power consumption, for instance, at least in part due to the expected reliability and sufficiency of power from, e.g., an electric grid. In such cases, the system may use more reference microphones (e.g., more channels), more adaptive filters (perhaps with higher resolution), higher sampling frequency, more sub-bands, etc., to provide more robust performance without concern for power consumption. Some examples may incorporate expected knowledge regarding the acoustic environment. For example, a portable system may be expected to perform in a more widely varying and/or changing acoustic environment while a non-portable (though moveable) system may be expected to operate among a more limited set of conditions that may not change much over time. Accordingly, a non-portable system may maintain or store adapted filter weights, e.g., when powered off, to use again at the next power-on event. A portable system may not benefit from storing previously converged filter weights because there may be no expectation that it will be turned on in the same acoustic environment as it was previously operated. A portable system operating on battery power may be more likely to be outside, with few reflected or reverberant signals, whereas a non-portable system may be expected to be inside, with walls nearby, having relatively strong noise signals from multiple directions. Accordingly, in various examples, various configurations including operational parameters, power consumption, processing resources, memory, etc. may be selected or chosen based upon one or more expected use scenarios and/or expected acoustic environments.

One or more of the above described systems and methods, in various examples and combinations, may be used to capture the voice of a user and isolate or enhance the user's voice relative to additional acoustic sources and background noise. Any of the systems and methods described, and variations thereof, may be implemented with varying levels of reliability based on, e.g., microphone quality, microphone placement, acoustic ports, structural or device frame design, threshold values, selection of adaptive, spectral, and other algorithms, weighting factors, window sizes, filter resolutions, sub-band frequency widths, etc., as well as other criteria that may accommodate varying applications and operational parameters.

One or more of the above described systems and methods, in various examples and combinations, may be used in a wide variety of audio systems, including home speaker systems, home theater systems, soundbars, portable speakers, and wearable audio devices in various form factors. Unless specified otherwise, the term wearable audio device, as used in this document, includes headphones and various other types of personal audio devices such as head, shoulder or body-worn acoustic devices (e.g., audio eyeglasses or other head-mounted audio devices) that include one more acoustic transducers to receive and/or produce sound, with or without contacting the ears of a user. One or more of the above described systems and methods, in various examples and combinations, may also be used in a system involving multiple devices that cooperate to receive sound input and/or produce sound. For example, such a system may include a first device with one or more microphones to receive sound input, the first device being in communication (via a wired or wireless connection) with a second device, which may have one or more acoustic transducers to produce sound. In such a system, the above described systems and methods may be present in the first device to capture the voice of a user and isolate or enhance the user's voice relative to additional acoustic sources and background noise, and the resulting voice signal and/or control signals based on the resulting voice signal may be provided to the second device to control one or more features or functions of the second device (audio-related or otherwise). It should be noted that although specific implementations of speaker systems primarily serving the purpose of acoustically outputting audio are presented with some degree of detail, such presentations of specific implementations are intended to facilitate understanding through provisions of examples and should not be taken as limiting either the scope of disclosure or the scope of claim coverage.

It should be understood that many of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), micro-controller(s), and the like, or any combination of these, may be suitable, and may include analog or digital circuit components and/or other components with respect to any particular implementation Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, microphone, driver, or loudspeaker, may be any of many types of transducers known in the art. For example, an acoustic structure coupled to a coil positioned in a magnetic field, to cause electrical signals in response to motion, or to cause motion in response to electrical signals, may be a suitable acoustic transducer. Additionally, a piezoelectric material may respond in manners to convert acoustical signals to electrical signals, and the reverse, and may be a suitable acoustic transducer. Further, micro-electrical mechanical systems (MEMS) may be employed as, or be a component for, a suitable acoustic transducer. Any of these or other forms of acoustic transducers may be suitable and included in various examples.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of enhancing an audio signal, the method comprising:
    receiving a primary signal from one or more microphones;
    receiving a plurality of reference signals, each of the plurality of reference signals from one of a plurality of reference microphones;
    receiving a playback signal;
    generating a driver signal based upon the playback signal;
    providing the driver signal to a transducer for conversion into an acoustic signal;
    generating an estimated echo signal based at least in part upon the playback signal;
    generating an estimated noise signal based upon the plurality of reference signals;
    evaluating, based at least in part upon a signal energy related to a playback volume, the effectiveness of at least one of the estimated echo signal or the estimated noise signal;
    controlling the generation of at least one of the estimated echo signal or the estimated noise signal based upon the evaluation; and
    reducing at least one of a noise content or an echo content from the primary signal to generate an output signal, the reduction based at least in part upon the estimated echo signal or the estimated noise signal.

2. The method of claim 1 wherein generating the estimated noise signal comprises adaptively filtering the plurality of reference signals to minimize an energy content of the output signal.

3. The method of claim 1 further comprising monitoring the output signal for a desired signal and freezing the adaptive filtering of the plurality of reference signals upon detecting the desired signal.

4. The method of claim 1 wherein controlling the generation of at least one of the estimated echo signal or the estimated noise signal comprises disabling the generation of the at least one of the estimated echo signal or the estimated noise signal.

5. An audio system, comprising:
    a primary input to receive a primary signal;
    a plurality of reference inputs, each of the plurality of reference inputs to receive a reference signal;
    a playback input to receive a playback signal;
    an echo canceller configured to generate an estimated echo signal based, at least in part, upon the playback signal;
    a null former configured to generate an estimated noise signal based, at least in part, upon one or more of the reference signals;
    a controller configured to evaluate, based at least in part upon a signal energy related to a playback volume, the effectiveness of at least one of the echo canceller or the null former and to control at least one of the echo canceller or the null former based upon the evaluation; and
    one or more combiners configured to produce an output signal, based upon the primary signal, with reduced echo or noise content based at least in part upon the estimated echo signal or the estimated noise signal.

6. The audio system of claim 5 wherein the null former is configured to generate the estimated noise signal by adaptively filtering the one or more reference signals to minimize an energy content of the output signal.

7. The audio system of claim 5 further comprising a detector configured to detect a desired signal component in the output signal and to pause adaptation of the adaptive filtering in response to detecting the desired signal.

8. The audio system of claim 5 wherein controlling at least one of the echo canceller or the null former comprises disabling the at least one of the echo canceller or the null former.

9. An audio system, comprising:
    an input to receive a playback signal;
    a transducer coupled to the input to produce an acoustic signal based upon the playback signal;
    a primary microphone to provide a primary signal;
    a reference microphone to provide a reference signal;

an echo canceller configured to generate an estimated echo signal based, at least in part, upon the playback signal;

a null former configured to generate an estimated noise signal based, at least in part, upon the reference signal;

a controller configured to evaluate, based at least in part upon a signal energy related to a playback volume, the effectiveness of at least one of the echo canceller or the null former and to control at least one of the echo canceller or the null former based upon the evaluation; and one or more combiners configured to produce an output signal, based upon the primary signal, with reduced echo or noise content based at least in part upon the estimated echo signal or the estimated noise signal.

10. The audio system of claim 9 wherein the null former is configured to generate the estimated noise signal by adaptively filtering the reference signal to minimize an energy content of the output signal.

11. The audio system of claim 9 further comprising a detector configured to detect a desired signal component in the output signal and to pause adaptation of the adaptive filtering in response to detecting the desired signal.

\* \* \* \* \*